May 21, 1963
F. MARKERT ET AL
3,090,746
REMOVING CARBON DEPOSITS FROM A CYCLONE IN
THE FLUID CRACKING OF HYDROCARBONS
Filed Sept. 22, 1959
3 Sheets-Sheet 2
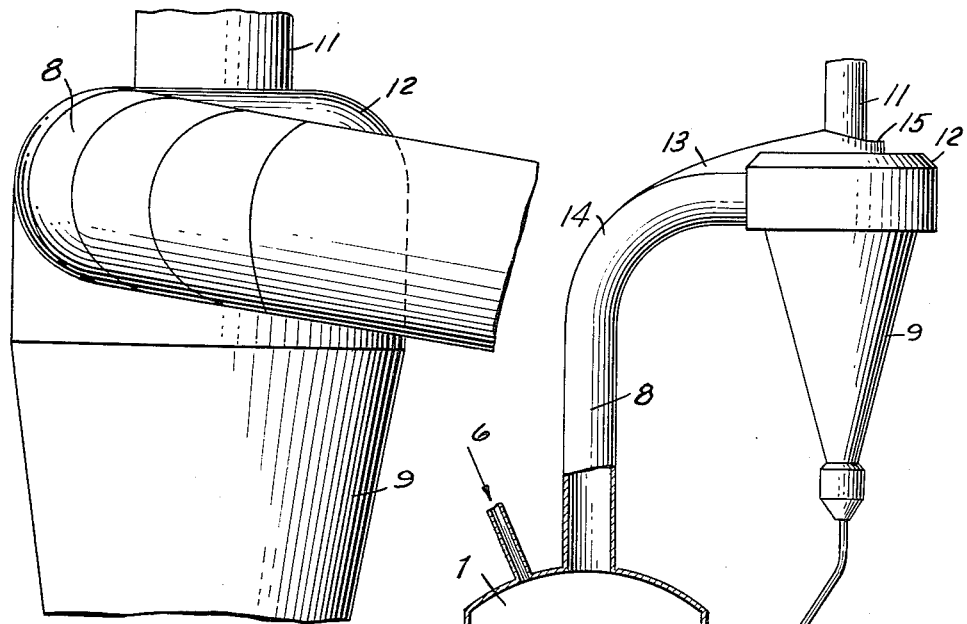
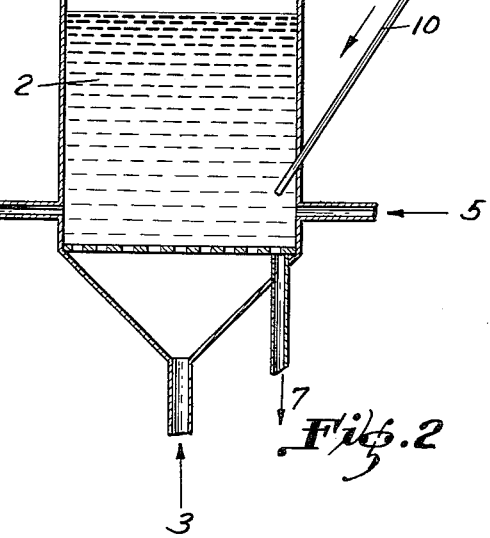
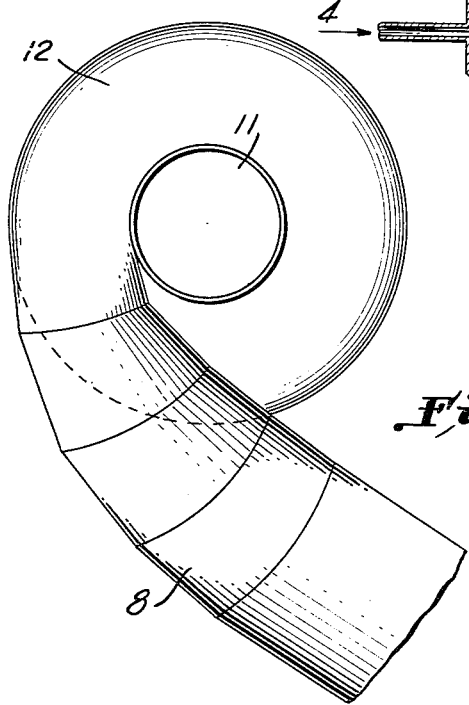
INVENTORS
FERDINAND MARKERT
HELMUT NONNENMACHER
WILLIBALD FUNK
HERMANN BIEBER
BY
ATTORNEYS

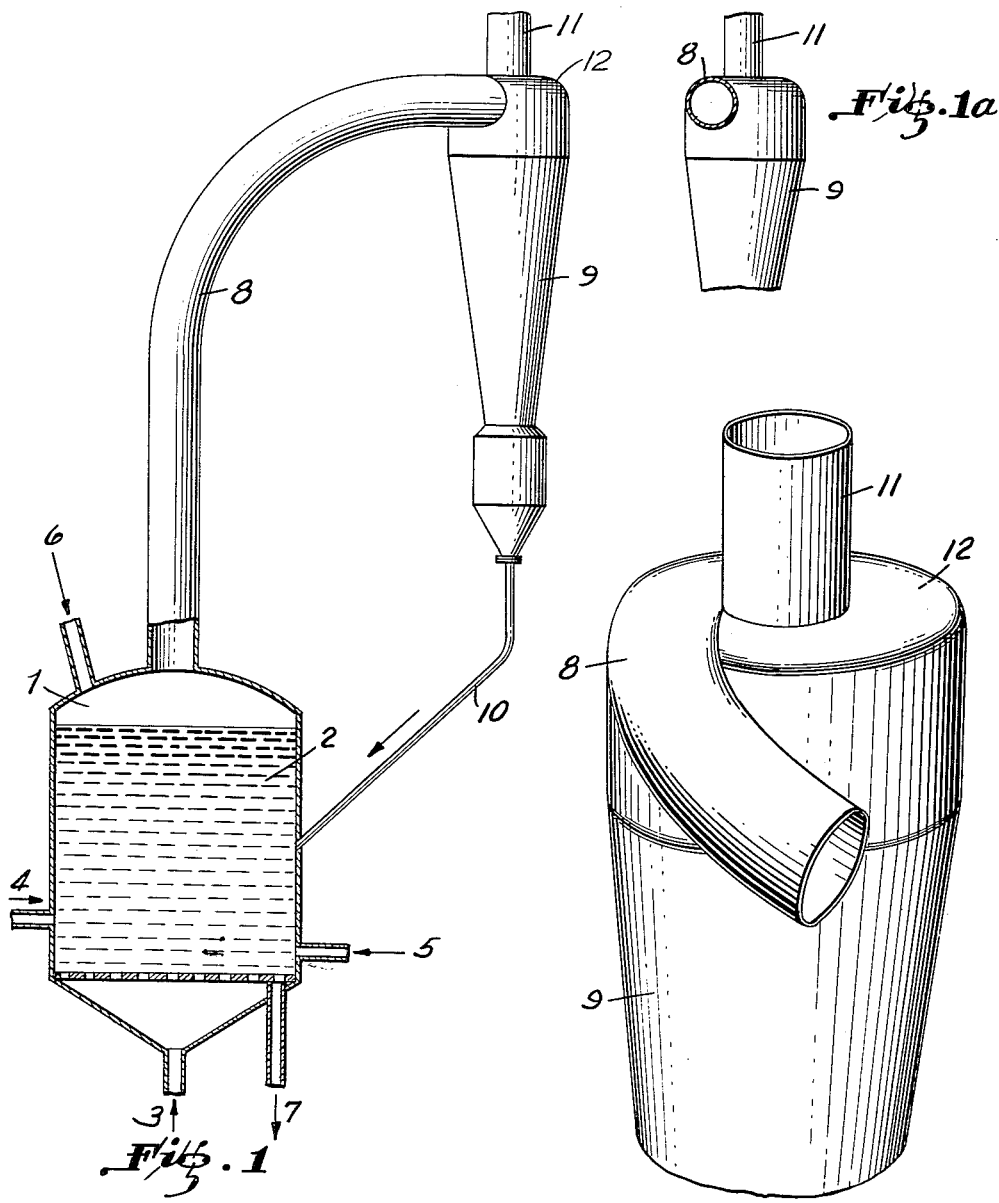

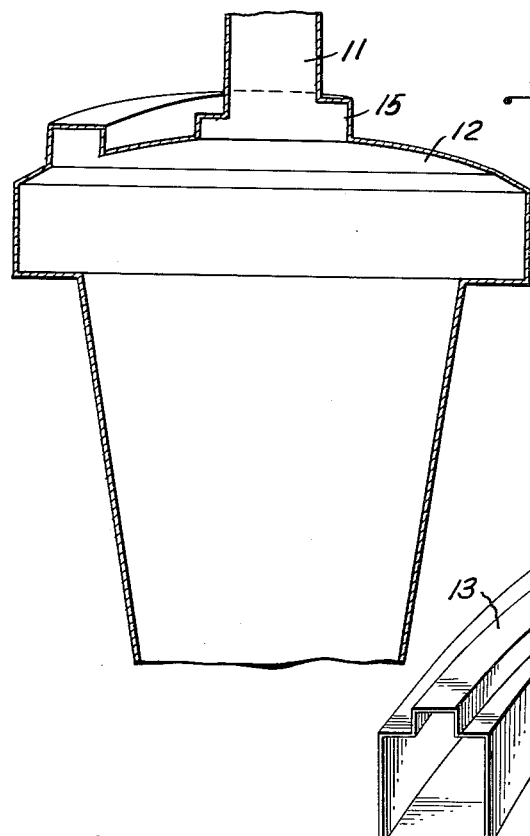
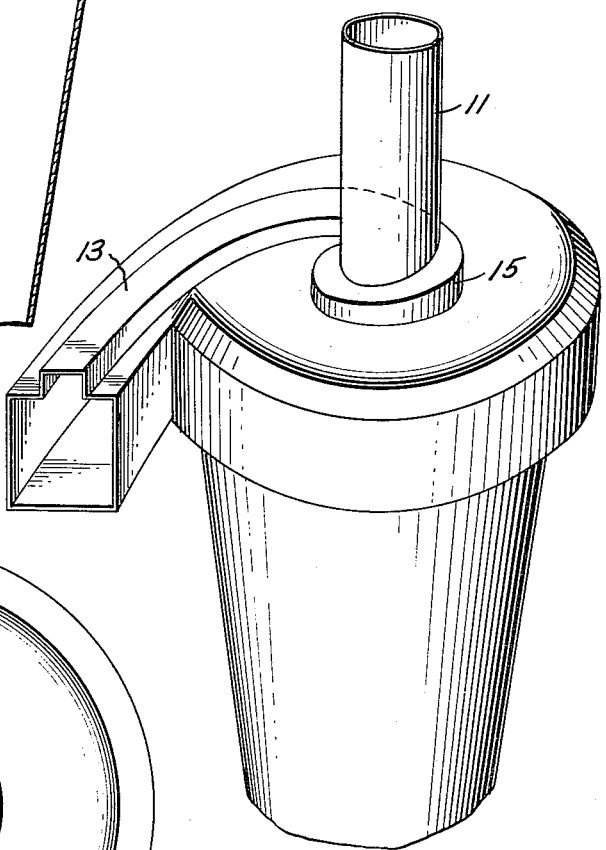
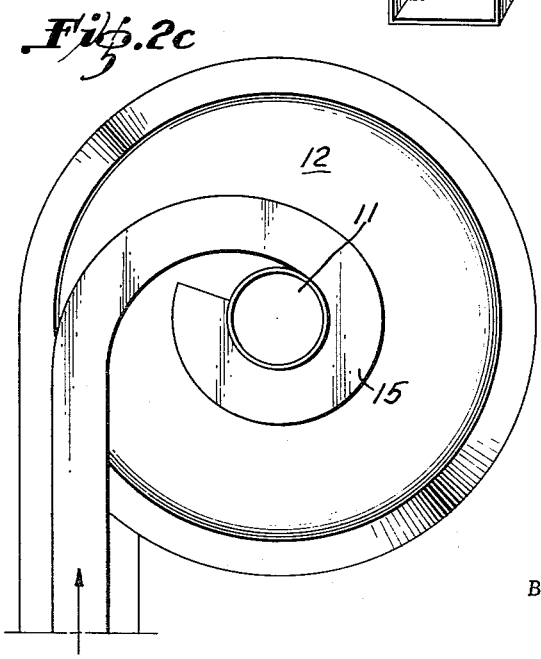

United States Patent Office 3,090,746
Patented May 21, 1963

3,090,746
REMOVING CARBON DEPOSITS FROM A CYCLONE IN THE FLUID CRACKING OF HYDROCARBONS
Ferdinand Markert, Helmut Nonnenmacher, Willibald Funk, and Hermann Bieber, all of Ludwigshafen (Rhine), Germany, assignors to Badische Anilin- & Soda-Fabrik Aktiengesellschaft, Ludwigshafen (Rhine), Germany
Filed Sept. 22, 1959, Ser. No. 841,521
Claims priority, application Germany Sept. 25, 1958
6 Claims. (Cl. 208—48)

This invention relates to a method for the cracking of hydrocarbons in fluidized layer or fluidized system processes on inert granular materials at temperatures between 630 and 900° C. and to apparatus for carrying out such processes.

It is known to crack gaseous or liquid hydrocarbons for the production of gaseous olefines, especially ethylene, by introducing the material to be cracked into a layer of strongly heated granular solid which is kept in fluidized motion throughout the entire height of the layer by gases or vapors. The reaction gas leaving the fluidized layer carries solid with it from the fluidized layer. The entrained solid is separated to a great extent by centrifugal force in a cyclone and returned to the fluidized layer again through a down pipe. The gaseous and vaporous reaction products are cooled in a co-current or counter-current washing, thereby freed from the remaining solid originating from the fluidized layer and also from carbon black, and then further worked up. At the high reaction temperatures of about 630° to 1000° C. necessary for the production of gaseous olefines, especially ethylene, undesirable side reactions, especially polymerizations, condensations and carbon black formation, take place in the space between the surface of the fluidized layer and the cooling device, especially in the cyclone itself. Oil coke settles on the walls of the pipes and apparatus after a time and this makes a continuous carrying out of the process extremely difficult.

It has been proposed to minimize these undesirable side reactions by carrying out from the fluidized layer by means of the reaction gas a very large amount of solid so that a relatively high solid concentration is present in the space above the fluidized layer. It has also been proposed to introduce additional solid into the cyclone inlet and into the pipe behind the cyclone.

It has however not been possible by the said measures completely to suppress the undesirable deposits. These deposits may become extremely troublesome and even interfere with continuous operation. They form especially on the cover of the cyclone, scale off when they have reached a certain thickness, and fall into the down pipe serving for the return of the solid. In this way the reflux of solid into the fluidized layer is disturbed or possibly entirely prevented so that operation must be discontinued. A further disadvantage is that large lumps of coke which have become detached pass through the down pipe into the fluidized layer and then onto the distributor plate where they accumulate and prevent the uniform dispersion of the fluidizing agent.

We have now found that the said disadvantage is avoided by bringing solid, especially from the fluidized layer, with the reaction gas and/or other gas to the upper boundary surface of the cyclone in the neighborhood of the gas outlet pipe, and making this upper boundary surface conical; or conical in stages, or cap-shaded and downwardly inclined, so that the solid particles are forced against the boundary surface by a component of the centrifugal force. The gas vortex forming in a centrifugal separator sets the solid particles in rotational movement, they roll downwardly from the point of their introduction along the upper boundary surface of the cyclone separator and thereby rub off the coke forming on the wall as it is being formed.

The solid may for example be continuously withdrawn from the fluidized layer by a revolving screw and introduced by a conveying gas, for example steam, in the desired manner into the cyclone. In order to avoid a cooling of the reaction gas and the consequent risk of condensations, it is preferable to heat the conveying gas to the reaction temperature. In some cases it is recommendable to subdivide the solid removed from the fluidized layer into screened fractions and to introduce only the coarser particles into the cyclone because these have a greater cleaning efficiency than fine particles. Solids from extraneous sources, as for example sharp-edged anthracite or corundum, may also be admixed or possibly used alone.

It is advantageous to use the reaction gas leaving the fluidized layer in order to convey solid from the fluidized layer to the desired points of the cyclone.

A convenient embodiment of our invention is illustrated in FIGURES 1, 1a, 1b, 1c and 1d of the accompanying drawings. The solid carried away from the fluidized layer by the reaction gas is introduced through a tube with circular cross-section into the cyclone tangentially to the upper boundary surface of the cyclone which is constructed as a curved surface with the same radius of curvature as the inlet tube. Already at the entry into the cyclone, a large part of the solid, by the guidance of the inlet tube which is curved from below, is carried by the gas stream to the upper boundary surface of the entry tube from where it moves around the gas outlet tube along the cover of the cyclone and then downwardly. Having regard to the size of the cyclone and of the inlet tube for gas, the gas laden with solid coming from the fluidized layer is introduced so that a part of the solid passes into direct proximity to the gas outlet tube.

In another embodiment of the invention according to FIGURES 2, 2a, 2b and 2c of the accompanying drawings, the cover of the cyclone is made conical in stages. For the purpose of uniformly distributing the solid particles over the upper boundary surface of the cyclone there is provided, around the outlet tube 11, an auxiliary cyclone 15 open at the bottom and operating according to the principle of the centrifugal separator, of which the inner boundary wall adjacent the outlet tube is possibly dispensed with, and of which the height becomes equal to zero by lowering its upper boundary surface after having passed through 360° or less, and the width of the channel may also diminish with the diminution of the height of the channel.

The supply of solid to the auxiliary cyclone may be carried out by leading into the auxiliary cyclone a partial stream of the reaction gas coming from the fluidized layer and the connecting pipe to the auxiliary cyclone at the other end may either dip into the fluidized layer or be attached at a suitable point to the gas pipe between the fluidized layer and cyclone, for example to the outer curvature of a bend. Regulation of the amount of solid supplied to the auxiliary cyclone may be effected by introducing vapor or gas free from solid into the connecting pipe to the auxiliary cyclone.

The supply of solid to the auxiliary cyclone may be effected through a channel 13, open at the bottom, coming from the inlet tube to the main cyclone; this channel, at the point of attachment to the auxiliary cyclone, preferably has the same height and width as the latter at this point; the inlet tube to the main cyclone is preferably constructed as a bend, the supply channel to the auxiliary cyclone beginning at the outer curvature of the said bend. When using an auxiliary cyclone, the cover of the same may also be made conical, provision being made by the installation of inserts at the outer wall of the auxiliary cyclone or by blowing in, for example, steam, that solid particles also pass along the cover of the auxiliary cyclone.

Any inert solid substance dimensionally stable at a temperature of between 630° and 900° C., as for example sand, pumice, sillimanite, synthetic stones rich in aluminum oxide, or corundum, may be used as the solid for introduction into the cyclone at the upper boundary surface thereof and for the fluidized layer itself. For the cracking of high boiling point hydrocarbons, as for example crude oils or oil residues, it is recommendable to use carbonaceous solids, as for example high temperature coke, or the oil coke produced in the cracking itself. Since the latter is formed in a very wide range of grain sizes, it may be advisable to separate suitable coarser fractions and use these for introduction into the cyclone at its upper boundary surface.

By the process according to our invention, hydrocarbons, especially saturated hydrocarbons, may be reacted in order to produce gaseous olefines. Examples of suitable initial materials are saturated gaseous hydrocarbons with from 2 to 5 carbon atoms, such as ethane, propane, butane, pentane, or mixtures thereof, or also hydrocarbons which are liquid under normal conditions, such as petroleum or certain petroleum fractions. By suitable petroleum fractions there are to be understood, for example, gasolenes having a boiling range from 30 to 150° C., gas oil boiling between 30 and 200° C. and petroleum residues boiling above 200° C.

The process lends itself for the production of gaseous olefines, especially gaseous olefines with from 2 to 4 carbon atoms, and also mixtures thereof. It is particularly suited for the production of ethylene and propylene.

In general, the inert substances or carbonaceous materials used in the fluidized layer should have a grain size of between 0.02 and 4.0 mm. in diameter, especially between 0.05 and 2.0 mm. The solids introduced into the cyclone from the fluidized layer or from extraneous sources may have a grain size of between 0.02 and 4.0 mm., especially 0.05 to 2.0 mm. The cleaning effect afforded by the solid at the inside of the cyclone's upper boundary surface can be increased by separating from the solid withdrawn from the fluidized layer those portions which have a comparatively large grain size and introducing only these into the cyclone. When introducing materials from extraneous sources it is therefore advantageous to employ a material having a grain size of between 0.5 and 4.0 mm. in diameter.

The solids may be introduced into the cyclone in an amount of between for example 2 and 80 kg., especially 10 to 60 kg. per kilogram of hydrocarbon. In accordance with our invention, for example, 3 to 30% by weight, especially 5 to 15% by weight of the amounts specified above are supplied to the inside of the upper boundary surface.

Working in the fluidized layer is at a temperature between 630 and 900° C., especially between 700 and 850° C., and at normal or increased pressure, especially for example at between 5 and 30 atmospheres.

The initial materials should preferably be preheated, the hydrocarbons being heated for example to a temperature between 250 and 500° C. and the water vapor and possibly oxygen to 200 to 600° C. The water vapor may also be heated to a higher temperature, e.g. up to 1100° C., and this measure may serve to introduce part of the heat necessary for the reaction.

The process is suitable in the same way for the pyrolytic cracking of hydrocarbons in a fluidized system comprising a reactor an da cumbustion chamber, in which solid is continually withdrawn from the fluidized layer of the cracking chamber, heated to a high temperature with air in a combustion chamber and returned to the fluidized layer in the cracking chamber, and for the pyrolytic autothermal cracking of hydrocarbons in a fluidized layer into which oxygen is continually introduced to maintain the reaction temperature.

In the pyrolytic cracking of hydrocarbons in a fluidized system comprising a reactor and a combustion chamber there are preferably used as fluidizable solids inert refractory pulverulent or granular materials, such as sand, sillimanite or corundum, having a grain size preferably averaging from 0.05 to 1.0 mm. The grain spectrum should be chosen so that satisfactory fluidization is ensured. For an average grain size of 0.15 mm., 20% of the material should have a grain size between 0.02 and 0.07, 60% between 0.07 and 0.2 and 20% between 0.2 and 1 mm. If the average grain size is to be 0.4, 20% of the material should have a grain size between 0.05 and 0.2, 60% between 0.2 and 0.5 and 20% between 0.5 and 3.0%. The material should for the most part be ball-shaped. In this embodiment of our invention, i.e. in the pyrolytic cracking of hydrocarbons in a fluidized system, working in the reaction vessel is preferably at temperatures between 720 and 850° C., the temperature in the combustion chamber being at least 30° C. higher, e.g., 750 to 1200° C. In order to provide the necessary heat, the carbon deposits on the fluidized material are completely oxidized. If necessary, additional heat may be introduced by combustion of fuels, or heat may be withdrawn by suitable cooling means. Usually 10 to 100, advantageously 20 to 50, tons of solid are circulated between the reactor and combustion chamber for every ton of hydrocarbon introduced into the reactor. An amount of water of for example 0.1 to 5.0 kg., advantageously 0.2 to 2.0 kg. is added for every kilogram of hydrocarbon.

In the pyrolytic autothermal cracking in a fluidized layer the same type of fluidizable materials may be used. We prefer however to use the oil coke formed in the cracking process. Water is added in the same quantity as described above for the fluidized system process. Oxygen is added in an amount sufficient to maintain the necessary reaction temperatures, e.g., 0.2 to 0.4 cubic meter of oxygen (NTP) for every kilogram of hydrocarbon. In the latter embodiment of our invention it is preferable to return to the reactor those hydrocarbons which boil above about 200° C. in an amount of, for example, 0.2 to 3.0 kg. after the gaseous and lower-boiling hydrocarbons have been separated.

The following examples, given with reference to the accompanying drawings, will further illustrate this invention but the invention is not limited to these examples or to the embodiments of apparatus shown in the drawings.

*Example 1*

A cracking chamber 1 (see FIGURES 1a to 1c) having a cross-sectional area of 1 square meter, has a metal grate provided with fine slots on which is situated a fluidized layer 2 consisting of oil coke in a grain size up to 2 mm. A mixture of about 450 kilograms of superheated steam and about 230 normal cubic meters of oxygen per hour is blown in through a pipe 3. 600 kilograms per hour of a Near Eastern crude oil are introduced through a pipe 4, and through a pipe 5 there is introduced the hydrocarbons boiling above about 250° C. formed by the process, in an amount of 400 kilograms per hour together with the carbon black formed by the process and the solid washed out from the cracked gas. The relative amounts of steam and oxygen are adjusted so that a reaction temperature of about 720° C. prevails in the fluidized layer. Under operating conditions, about 400 cubic meters of gas and vapor flow per hour from the fluidized layer 2 into the cyclone 9 through the connecting pipe 8 which has a circular cross-section. The height of the fluidized layer is adjusted by appropriate supply of oil coke at 6 and withdrawal at 7 that about 20 metric tons per hour of solid are entrained by the gases and vapors from the fluidized layer. This solid is introduced into the cyclone 9 at its upper boundary surface 12, moves downwardly thereon and flows through the down pipe 10 back into the fluidized layer. The degree of deposition amounts to 99.7%. A few percent of the total solid introduced into the cyclone at the upper boundary surface 12 are situated upon entry into the cyclone in direct proximity to the gas outlet pipe 11. For each metric ton of fresh oil there are formed about 170 kilograms of ethylene and about 200 kilograms of higher gaseous olefines which escape through the gas outlet pipe 11. Moreover there is also formed a residual gas of high calorific value, a gasolene containing a large proportion of aromatics and an oil coke.

The process can be carried out continuously for months without disturbances occurring by deposits on the cover of the cyclone.

*Example 2*

The process illustrated in FIGURES 2a to 2c is carried out under the same conditions as specified in Example 1. Of the 20 metric tons of solid which are entrained from the fluidized layer per hour by the 4000 cubic meters of cracked gas and vapor, about 2 metric tons are introduced through the open channel 13 from the outside of the bend 14 into the auxiliary cyclone 15 for the uniform distribution of the solid rolling on the surface of the gas vortex; from the auxiliary cyclone 15 the solid rotates outwardly over the conical cover 12 of the main cyclone. In this case also, no disturbance by deposits on the cover of the cyclone occurs even after operation for months.

What we claim is:

1. In combination with a process for producing gaseous olefines by cracking hydrocarbons in a fluidized layer reaction zone of solid particles at a temperature of between about 630° C. and 900° C. and in the presence of steam, said solid particles being entrained from the fluidized layer by the reaction gases and separated therefrom by centrifugal force in a cyclone zone and returned from the bottom of said cyclone zone to the fluidized layer reaction zone, and said cyclone zone being enclosed by side surfaces extending downwardly to an outlet for said return of solid particles and by a top covering surface which converges upwardly from said side surfaces into a gaseous outlet for the effluent reaction gases, a method of maintaining said cyclone zone free of carbon deposits which comprises: supplying the reaction gases containing entrained solid particles from said fluidized layer to the top of said cyclone zone such that at least part of said entrained particles are directed tangentially upwardly to first contact and rotate centrifugally along the inner portion of said converging top covering surface adjacent said gaseous outlet and then to spiral downwardly along the remaining portion of said top covering surface, thereby rubbing off carbon deposits which form on said top covering surface.

2. The method as claimed in claim 1 wherein additional solid particles from an extraneous source are introduced into the reaction gases from said fluidized layer for supply into said cyclone zone, said additional particles consisting essentially of a sharp-edged abrasive material.

3. In combination with an apparatus for producing gaseous olefines by cracking hydrocarbons in a fluidized layer of solid particles wherein said apparatus includes a cyclone adapted to receive the effluent reaction gases containing entrained solid particles from said fluidized layer and to separate said particles from said gases, an inlet pipe to conduct said gases with said entrained particles from said fluidized layer into said cyclone, a down pipe to return the separated solid particles from the bottom of said cyclone to said fluidized layer and a gas outlet pipe at the top of said cyclone to withdraw the separated gases, the improvement which comprises: a cyclone having side walls extending downwardly into said down pipe and a top cover which converges upwardly from said side walls into a concentrically located opening into said gas outlet pipe; and an inlet pipe which enters said top cover at the juncture therebetween in a substantially upward direction and tangentially to the inner surface of said top cover, the inner surface of said inlet pipe merging smoothly with said inner surface of said top cover.

4. An apparatus as claimed in claim 3 wherein said top cover is a conically shaped curved dome and said inlet pipe has a circular cross-section in which the radius of curvature at the juncture with said top cover coincides with the radius of curvature of said curved dome.

5. An apparatus as claimed in claim 3 wherein said top cover is conical in stages extending from said side walls to said concentrically located opening into said gas outlet pipe.

6. An apparatus as claimed in claim 3 wherein the inner surface of said inlet pipe joins with the inner surface of said top cover to define a continuous spiral path for the flow of said reaction gases containing entrained solid particles, said spiral path extending inwardly across the top of said cyclone to the innermost surface area thereof adjacent said concentrically located opening.

References Cited in the file of this patent

UNITED STATES PATENTS

| | | |
|---|---|---|
| 1,344,146 | Peck | June 22, 1920 |
| 1,823,587 | Cahoon et al. | Sept. 15, 1931 |
| 2,295,101 | Dunham | Sept. 8, 1942 |
| 2,549,117 | Nelson | Apr. 17, 1951 |
| 2,588,106 | Frangquist | Mar. 4, 1952 |
| 2,763,601 | Martin et al. | Sept. 18, 1956 |
| 2,859,168 | Downing et al. | Nov. 4, 1958 |
| 2,863,821 | Dunlop et al. | Dec. 9, 1958 |
| 2,865,521 | Fisher et al. | Dec. 23, 1958 |
| 2,901,331 | Held et al. | Aug. 25, 1959 |
| 2,880,169 | Boisture | Mar. 31, 1959 |
| 2,934,489 | Canevari | Apr. 26, 1960 |
| 2,934,494 | Kleiber | Apr. 26, 1960 |
| 2,963,421 | Luckenbach | Dec. 6, 1960 |